(12) United States Patent
Liu et al.

(10) Patent No.: US 7,586,010 B2
(45) Date of Patent: Sep. 8, 2009

(54) PHOSPHONITE-CONTAINING CATALYSTS FOR HYDROFORMYLATION PROCESSES

(75) Inventors: Yun-Shan Liu, College Station, TX (US); Thomas Allen Puckette, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/941,217

(22) Filed: Nov. 16, 2007

(65) Prior Publication Data

US 2008/0154067 A1 Jun. 26, 2008

Related U.S. Application Data

(63) Continuation-in-part of application No. 11/670,628, filed on Feb. 2, 2007, now abandoned.

(60) Provisional application No. 60/871,158, filed on Dec. 21, 2006.

(51) Int. Cl.
C07C 45/50 (2006.01)
B01J 31/00 (2006.01)

(52) U.S. Cl. .................. 568/454; 502/162; 502/166

(58) Field of Classification Search .............. 568/454; 502/162, 166
See application file for complete search history.

(56) References Cited

U.S. PATENT DOCUMENTS

| | | | |
|---|---|---|---|
| 4,599,206 A | 7/1986 | Billig et al. | |
| 4,608,239 A | 8/1986 | Devon | |
| 4,668,651 A | 5/1987 | Billig et al. | |
| 4,873,213 A | 10/1989 | Puckette et al. | |
| 4,912,155 A | 3/1990 | Burton | |
| 5,298,541 A | 3/1994 | Bohshar et al. | |
| 5,721,403 A | 2/1998 | Hoppie et al. | |
| 5,840,647 A | 11/1998 | Puckette et al. | |
| 6,130,358 A | 10/2000 | Tolleson et al. | |
| 6,265,620 B1 | 7/2001 | Urata et al. | |
| 6,362,354 B1 | 3/2002 | Bunel et al. | |
| 6,437,192 B1 | 8/2002 | Bunel | |
| 6,440,891 B1 | 8/2002 | Maas et al. | |
| 2003/0144559 A1 | 7/2003 | Hess et al. | |

FOREIGN PATENT DOCUMENTS

| | | |
|---|---|---|
| EP | 0 301 355 A2 | 2/1989 |
| EP | 0 416 321 A1 | 3/1991 |
| WO | WO 2006/003431 | 1/2006 |

OTHER PUBLICATIONS

Louis D. Quin; A Guide to Organophosphorus Chemistry; Derivatives from Phosphonous Dichlorides; p. 62; John Wiley and Sons, Inc.; New York.

Michael B. Smith and Jerry March; March's Advanced Organic Chemistry; Free-Energy Differences between Equatorial and Axial Substiuents on a Cyclohexane Ring (A Values); pp. 174-175; Fifth Edition; John Wiley and Sons, Inc., New York.

Selent, Wiese, Rottger, Borner; Novel Oxyfunctionalized Phosphonite Ligands for the Hydroformylation of Isomeric n-Olefins; Angew. Chem. Ind.; 2000; pp. 1639-1641; No. 9; Wiley-VCH Verlag GmbH, D-69451 Weinheim, 2000.

Claver, Fernandez, Gillon, Heslop, Hyett, Martorell, Orpen, Pringle; Biarylphosphonites: a class of monodentate phosphorus(III) ligands that outperform their chelating analogues in asymmetric hydrogenation catalysis; Feb. 29, 2000; Apr. 17, 2000; pp. 961-962.

Jeon, Park, Kim; Hydroformylation of Mixed Octenes Using Rhodium=Bulky Phosphonite Complexes with Excellent Catalytic Activity and Stability; The Chemical Society of Japan; 2004; pp. 174-175; vol. 33, No. 2.

Rooy, Kamer, van Leeuwen, Goubitz, Fraanje, Veldman, Spek; Bulky Diphosphite-Modified Rhodium Catalysts: Hydroformylation and Characterization; American Chemical Society; 1996; pp. 835-849; vol. 15; No. 2.

Office Action dated Jul. 20, 2007 from co-pending U.S. Appl. No. 11/670,628.

Gordon, et al.; The Chemist's Companion; Kinetics and Energetics; 1972; pp. 156-161; John Wiley & Sons, New York.

Senderowitz et al; Journal Am. Soc.; A Smart Monte Carlo Technique for Free Energy Simulation of Muliconformational Molecules; 1995; pp. 8211-8219; American Chemical Society.

U.S. Appl. No. 61/016,661 filed on Dec. 26, 2007 (Eastman docket 80603 US01).

U.S. Appl. No. 12/330,023 filed on Dec. 8, 2008 (Eastman docket 80603 US02).

U.S. Appl. No. 61/016,665 filed on Dec. 26, 2007 (Eastman docket 80621 US01).

U.S. Appl. No. 12/330,038 filed Dec. 8, 2008 (Eastman docket 80621 US02).

International Search Report dated Mar. 26, 2009, for International Application PCT/US2008/013774 (Eastman docket 80621).

Tullock et al., "Synthesis of Fluorides by Metathesis with Sodium Fluoride", J. Org. Chem., vol. 25, pp. 2016-2019 (1960).

Meyer et al., "Preparation and Single Crystal X-Ray Diffraction Study of Some Fluorophosphites and Phosphite Esters", Z. Naturforsch, Bi. Chem. Sci., 48b, 659-671 (1993).

Puckette, "Catalysis of Organic Reactions", Edited by S. R. Schmidt, CRC Press (2006) pp. 31-38.

(Continued)

Primary Examiner—Sikarl A Witherspoon
(74) Attorney, Agent, or Firm—Jennifer R. Knight; Bernard J. Graves, Jr.

(57) ABSTRACT

Disclosed are catalyst solutions for preparing aldehydes with variable normal- to iso-aldehyde ratios comprising one or more phosphonite ligands, rhodium, and a hydroformylation solvent. Also disclosed is a process for preparing aldehydes with variable normal- to iso-aldehyde ratios comprising contacting an olefin, hydrogen, and carbon monoxide with one or more phosphonite ligands, rhodium, and a hydroformylation solvent. The phosphonite-based catalyst solutions provide the ability to manipulate the normal- to iso-aldehyde ratio by varying one or more process variables including carbon monoxide partial pressure, temperature, and gram moles ligand to gram atoms rhodium.

7 Claims, No Drawings

Barros et al., "Rhodium catalyzed hydroformylation of conjugated dienes: Remarkable accelerative effect of triphenylphosphine", Catalysis Communications 8 (2007) 747-750.

Diéguez et al., "High-Pressure Infrared Studies of Rhodium Complexes Containing Thiolate Bridge Ligands under Hydroformylation Conditions", Organometallics 1999, 18, 2107-2115.

Aubry et al., "The unusual inhibition of a dirhodium tetraphosphine-based bimetallic hydroformylation catalyst by $PPh_3$", C.R. Chimie 5 (2002) 473- 480.

White et al., "Structural Implications of Nuclear Magnetic Resonance Studies on 1-R-1-Phospha-2,6-dioxacyclohexanes", Journal of the American Chemical Society, 92:24, Dec. 2, 1970, 7125-7135.

da Silva et al., "Rhodium catalyzed hydroformylation of linalool", Applied Catalysis A: General 309 (2006) 169-176.

Olivier et al., "Make Aldehydes by New Oxo Process", Hydrocarbon Processing, Apr. 1970, pp. 112-114.

van Leeuwen et al., "Hydroformylation of Less Reactive Olefins with Modified Rhodium Catalysts", Journal of Organometallic Chemistry, 258 (1983) 343-350.

Kalck, "Cooperative Effect Between Two Metal Centres in Hydroformylation: Routes Towards Heterobimetallic Catalysts", Polyhedron, vol. 7, No. 22/23, pp. 2441-2450, 1988.

Kramer et al., "Rhodium Phosphite Catalysts", Rhodium Catalyzed Hyrdoformylation, Edited by van Leeuwen et al., Kluwer Academic Publishers, pp. 35-62.

van Leeuwen et al., "Phosphines as ligands; Bite angle effects for diphosphines", Rhodium Catalyzed Hyrdoformylation, Edited by van Leeuwen et al., Kluwer Academic Publishers, pp. 63-75.

PHOSPHONITE-CONTAINING CATALYSTS FOR HYDROFORMYLATION PROCESSES

CROSS-REFERENCE TO RELATED APPLICATIONS

This application is a continuation-in-part and claims the benefit of U.S. Nonprovisional application Ser. No. 11/670,628 filed on Feb. 2, 2007, now abandoned which claims the benefit of U.S. Provisional Application Ser. No. 60/871,158 filed on Dec. 21, 2006, the disclosure of which is incorporated herein by reference in its entirety.

FIELD OF THE INVENTION

This invention pertains to a novel catalyst solution comprising (1) at least one phosphonite ligand having particular steric bulk characteristics; (2) rhodium; and (3) a hydroformylation solvent. The present invention also pertains to the use of the novel catalyst solution for the hydroformylation of olefins to produce aldehydes. The novel catalyst solution can produce variable normal- to iso-aldehyde ratios by modest changes in process conditions.

BACKGROUND OF THE INVENTION

The hydroformylation reaction, also known as the oxo reaction, is used extensively in commercial processes for the preparation of aldehydes by the reaction of one mole of an olefin with one mole each of hydrogen and carbon monoxide. The most extensive use of the reaction is in the preparation of normal- and iso-butyraldehyde from propylene. The ratio of the amounts of the normal- to iso-aldehyde products typically is referred to as the normal- to iso-aldehyde (N:I) ratio or the normal- to branched-aldehyde (N:B) ratio. In the case of propylene, the normal- and iso-butyraldehydes obtained from propylene are in turn converted into many commercially valuable chemical products such as, for example, n-butanol, 2-ethyl-hexanol, n-butyric acid, iso-butanol, neopentyl glycol, 2,2,4-trimethyl-1,3-pentanediol, the mono-isobutyrate and di-isobutyrate esters of 2,2,4-trimethyl-1,3-propanediol. The hydroformylation of higher α-olefins such as 1-octene, 1-hexene, and 1-decene yield aldehyde products which are useful feedstocks for the preparation of detergent alcohols and plasticizer alcohols. The hydroformylation of substituted olefins such as allyl alcohol is useful for the production of other commercially valuable products such as 1,4-butanediol. Because the demand for the downstream products made from normal- and iso-aldehydes varies as a result of periodic market needs, longer-term market trends, and shorter-term process dynamics such as inventory control, there is often a need to vary the normal- to iso-aldehyde ratio during normal process operations.

Although different hydroformylation catalyst systems produce different nominal normal- to iso-aldehyde ratios, it is advantageous to vary the normal- to iso-aldehyde ratios during normal process operation without changing the catalyst system and by employing only modest changes in process conditions that are readily varied during normal operations.

SUMMARY OF THE INVENTION

We have discovered highly active rhodium catalyst solutions with phosphonite ligands having particular steric bulk characteristics are useful in the hydroformylation reaction to prepare aldehydes where modest changes in process conditions result in significant changes of the normal- to iso-aldehyde ratio. Thus, one embodiment of the present invention is a catalyst solution comprising:

i. one or more phosphonite ligands having the general formula (I):

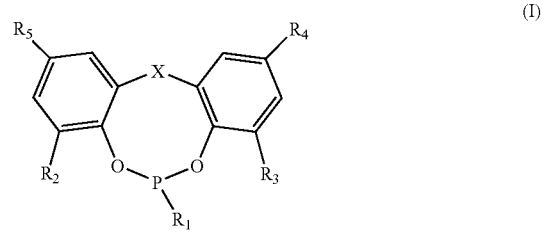

wherein:
$R_1$, $R_2$, and $R_3$ are independently selected from hydrocarbyl radicals with 2 to 20 carbon atoms;

$R_4$ and $R_5$ are independently selected from hydrogen and hydrocarbyl radicals;

$R_2$, $R_3$, $R_4$, and $R_5$ in total contain 4 to 40 carbon atoms;

$R_1$, $R_2$, and $R_3$ together have a steric bulk, $A_{TOT}$, of about 6.2 to about 11.5 kcal/mol as calculated by the following formula: $A_{TOT}=A_1+A_2+A_3$ wherein $A_1$, $A_2$, and $A_3$ are the A values for $R_1$, $R_2$, and $R_3$, respectively; and X is optionally present as a connecting group comprising (a) a chemical bond directly between the ring carbon atoms of each aromatic group, (b) sulfur, oxygen, nitrogen, or silicon, or (c) a group having formula (II):

wherein $R_6$ and $R_7$ are independently selected from hydrogen and alkyl radicals with up to 8 carbon atoms;

ii. rhodium; and iii. a hydroformylation solvent.

We have found that phosphonite ligands bearing substituents with these certain $A_{TOT}$ values enable variable normal- to iso-aldehyde ratios. This embodiment comprises a solution of the active catalyst in which a carbonylation process such as the hydroformylation of an ethylenically-unsaturated compound may be carried out.

Another embodiment of the present invention pertains to a hydroformylation process utilizing the above-described catalyst solutions. The process of the present invention therefore includes a process for preparing aldehydes comprising contacting an olefin, hydrogen, and carbon monoxide with a catalyst solution comprising:

i. one or more phosphonite ligands having the general formula (I):

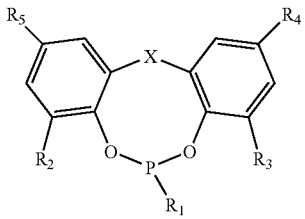

wherein:
$R_1$, $R_2$, and $R_3$ are independently selected from hydrocarbyl radicals with 2 to 20 carbon atoms;
$R_4$ and $R_5$ are independently selected from hydrogen and hydrocarbyl radicals;
$R_2$, $R_3$, $R_4$, and $R_5$ in total contain 4 to 40 carbon atoms;
$R_1$, $R_2$, and $R_3$ together have a steric bulk, $A_{TOT}$, of about 6.2 to about 11.5 kcal/mol as calculated by the following formula: $A_{TOT}=A_1+A_2+A_3$ wherein $A_1$, $A_2$, and $A_3$ are the A values for $R_1$, $R_2$, and $R_3$, respectively; and
X is optionally present as a connecting group comprising (a) a chemical bond directly between the ring carbon atoms of each aromatic group, (b) sulfur, oxygen, nitrogen, or silicon, or (c) a group having formula (II):

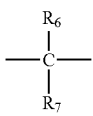

wherein $R_6$ and $R_7$ are independently selected from hydrogen and alkyl radicals with up to 8 carbon atoms;
ii. rhodium; and
iii. a hydroformylation solvent.

Another embodiment of the present invention pertains to a process for the hydroformylation of propylene wherein the percent normal-butyraldehyde produced varies in response to a change in one or more process parameters selected from temperature, carbon monoxide partial pressure, and ratio of gram moles phosphonite ligand to gram atoms rhodium.

DETAILED DESCRIPTION

The present invention provides a catalyst solution and a process for preparing aldehydes where modest changes in process conditions, such as, for example, the ratio of gram moles ligand to gram atoms rhodium, the process temperature, and the partial pressures of carbon monoxide and hydrogen, result in significant changes of normal- to iso-aldehyde ratios. One aspect of the present invention, therefore, is a catalyst solution comprising:

i. one or more phosphonite ligands having the general formula (I):

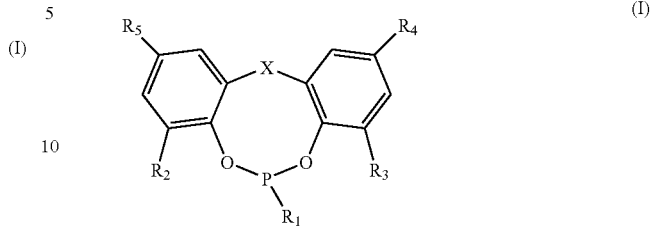

wherein:
$R_1$, $R_2$, and $R_3$ are independently selected from hydrocarbyl radicals with 2 to 20 carbon atoms;
$R_4$ and $R_5$ are independently selected from hydrogen and hydrocarbyl radicals;
$R_2$, $R_3$, $R_4$, and $R_5$ in total contain 4 to 40 carbon atoms;
$R_1$, $R_2$, and $R_3$ together have a steric bulk, $A_{TOT}$, of about 6.2 to about 11.5 kcal/mol as calculated by the following formula: $A_{TOT}=A_1+A_2+A_3$ wherein $A_1$, $A_2$, and $A_3$ are the A values for $R_1$, $R_2$, and $R_3$, respectively; and
X is optionally present as a connecting group comprising (a) a chemical bond directly between the ring carbon atoms of each aromatic group, (b) sulfur, oxygen, nitrogen, or silicon, or (c) a group having formula (II):

$$\begin{array}{c} R_6 \\ | \\ -C- \\ | \\ R_7 \end{array} \quad (II)$$

wherein $R_6$ and $R_7$ are independently selected from hydrogen and alkyl radicals with up to 8 carbon atoms;
ii. rhodium; and
iii. a hydroformylation solvent.

The term "solution", as used herein, is understood to mean that the phosphorus compound and rhodium components are substantially (i.e., 95 or greater weight percent of the phosphorus compound and rhodium) dissolved in the hydroformylation solvent. The term "phosphonite ligand", as used herein, is understood to mean a trivalent phosphorus compound where the phosphorus atom is bonded to two oxygen atoms and one carbon atom and each oxygen atom is also bonded to a separate carbon atom.

The term "substituent", as used herein, is understood to mean the atom or groups of atoms represented by $R_1$, $R_2$, $R_3$, $R_4$, $R_5$, $R_6$, $R_7$, $R_8$, and $R_9$ and the chemical bond, atom, or groups of atoms represented by X.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The ligands for the present invention are triorganophosphonite compounds having the formula (I):

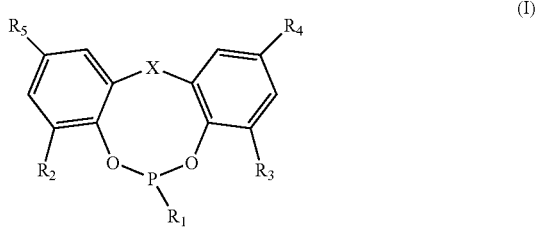

The substituents, $R_1$, $R_2$, $R_3$, $R_4$, and $R_5$, may be the same or different. $R_1$, $R_2$, and $R_3$ may be individually selected from alkyl, aralkyl, cycloalkyl, and aryl groups containing from 2 to 20 carbon atoms, typically from 2 to 15 carbon atoms. $R_4$ and $R_5$ may be individually selected from hydrogen, alkyl, cycloalkyl, and aryl groups. The total carbon content of $R_2$, $R_3$, $R_4$, and $R_5$ is about 4 to about 40 carbon atoms, typically about 4 to about 20 carbon atoms. Examples of the alkyl groups which $R_1$, $R_2$, $R_3$, $R_4$, and $R_5$ individually may represent include ethyl, butyl, pentyl, hexyl, 2-ethylhexyl, octyl, decyl, dodecyl, octadecyl and various isomers thereof. $R_4$ and $R_5$ individually may also be a methyl radical. The alkyl groups may be substituted, for example, with up to two substituents such as alkoxy, cycloalkoxy, formyl, alkanoyl, cycloalkyl, aryl, aryloxy, aroyl, carboxyl, carboxylate salts, alkoxycarbonyl, alkanoyloxy, cyano, sulfonic acid, sulfonate salts and the like. Cyclopentyl, cyclohexyl and cycloheptyl are examples of the cycloalkyl groups that $R_1$, $R_2$, $R_3$, $R_4$, and $R_5$ may represent. The cycloalkyl groups, in turn, may be substituted with alkyl or any of the substituents described with respect to the possible substituted alkyl groups. Non-limiting examples of alkyl and cycloalkyl groups which $R_1$, $R_2$, $R_3$, $R_4$, and $R_5$ also individually may represent are alkyl radicals of up to 8 carbon atoms, benzyl, cyclopentyl, cyclohexyl or, cycloheptyl.

We have discovered that ligands which have a steric bulk characterized by an $A_{TOT}$ within the range of about 6.2 to about 11.5 kcal/mol produce a range of normal- to iso-aldehyde ratios in response to modest changes of process variables such as gram mole ligand to gram atom rhodium ratio, temperature, and the partial pressures of carbon monoxide and hydrogen. The term "steric bulk," as used herein, is intended to mean the spatial requirements of substituents. The relative "A" values of substituents of a cyclohexyl molecule can be conveniently used to characterize the relative steric bulk of the phosphonite ligands. "A" values represent the free energy required for various substituents attached to a cyclohexylmolecule to go from the equatorial position to the axial position. "A" Values are sometimes referred to as conformational energies. "A" values for various substituents of a cyclohexyl molecule are known. A discussion of the "A" value term can be found in many organic chemistry texts. For example see Michael B. Smith and Jerry March, *March's Advance Organic Chemistry 5th Edition;* Wiley Interscience; New York; 2001; pp. 173-74.

An important trend to be observed in the data of "A" values is that steric effects are primarily determined by the first and second atoms in the substituent of concern. More distantly removed atoms in the third, fourth, and other more removed positions exert progressively less influence on the overall "A" value. For example from the March reference, the isopropyl substituent has an "A" value of 2.15 which is the same as a cyclohexyl substituent. Those atoms in the cyclohexyl substituent that are more that two carbon atoms removed from the connective bond have no influence on the overall "A" value. The cyclohexyl substituent is a somewhat less than an optimal comparison because the ring structure of the cyclohexyl group constrains the carbon atoms in the third and fourth atom positions from the connective point into limit spatial movements.

Another example which shows the decreasing steric influence as the distance from the connection point increases is found in a listing of "A" values from page 157 of the book "The Chemist's Companion" by Arnold Gordon and Richard Ford (Wiley Interscience, 1972). In this case, the neopentyl substituent (—$CH_2$—$C(CH_3)_3$) can be compared to the isopropyl substituent —CH—$(CH_3)_2$ and the ethyl substituent (—$CH_2$—$CH_3$). The "A" value for the neopentyl substituent is given as 2.0 which is smaller than the 2.15 for isopropyl but only slightly larger that the 1.75 value given for the ethyl substituent. The methyl groups of the neopentyl substituent are at the distance of the third atom away from the connective point and exert only a small steric influence despite the fact that there are three of them present. The ethyl substituent has only hydrogen atoms at the distance of the third atom from the connective point and exhibits only a slightly smaller "A" value than the neopentyl substituent. Thus one skilled in the art concludes that at the third atom position from the connective point, the methyl group and hydrogen are nearly equal in their steric influence.

One skilled in the art recognizes that an ethyl group will have very nearly the same "A" value as a propyl group or any other linear alkyl group such a butyl, decyl or hexadecyl. This is because the steric bulk of the substituent is determined only by the first 3 atoms and primarily by the first two atoms of the group and that anything further out than 3 atoms on the substituent does not contribute to the overall "A" value. Therefore, one skilled in the art can find an "A" values for many substituents in the open literature, and if necessary, estimate an "A" value for substituents $R_1$, $R_2$, or $R_3$ based upon the first 2 atoms connected to the ligand.

As a further example, the tertiary butyl group is listed with an "A" value of 4.9 kcal/mol. Following the discussion above, one skilled in the art would expect all tertiary alkyl groups including tertiary pentyl (2-methyl-2-butyl) group to have similar steric bulk characteristics to the tertiary butyl group. Other groups which would be similar in steric size to the tertiary butyl group include the 1-methyl-1-cyclohexyl, 1-ethyl-1-cyclopentyl, and the 2-ethyl-3-pentyl groups. One skilled in the art would recognize that the "A" value of a tertiary butyl group, 4.9 kcal/mol, is a reasonable estimate of an "A" value for all tertiary alkyl groups.

The phenyl group has an "A" value of 2.7 kcal/mol. One skilled in the art would recognize that substituted phenyl groups, such as a 2-ethylphenyl, 3-methylphenyl, or 4-butylphenyl would have an "A" value of no less than 2.7 kcal/mol because the alkyl substituent groups are all larger than the hydrogen atoms which they replace. One skilled in the art would also expect that the effect of the substituent may be marginalized when the substitutions on the phenyl rings are spatially removed from the center of concern (i.e., the phosphorus atom) by two or more atoms. For purposes of simplicity and convenience, one skilled in the art can estimate the "A:" values for substituted phenyl groups to be no less than 2.7 kcal/mol.

A similar discussion can be made about fused aromatic rings such as the 1-naphthyl, 2-naphthyl, 1-anthracenyl and other fused aromatic groups. One skilled in the art would recognize that these groups would be expected to have an "A" value of no less than an unsubstituted phenyl group, 2.7 kcal/mol. The introduction of the fused aromatic rings obviously increases the size of the substituents because the new rings are larger than hydrogen atoms they replace. As stated above, however, the steric effects of substituents that are two or more atoms removed from the center of concern (i.e., the phosphorus atom) are marginalized by the spatial distance between the new groups and the center of concern.

The steric bulk of the phosphonite ligands can be characterized by the combined "A" values of $R_1$, $R_2$, and $R_3$. Specifically for the present invention, the steric bulk of the phosphonite ligands is characterized by $A_{TOT}$, where $A_{TOT}$ is calculated as follows:

$$A_{TOT} = A_1 + A_2 + A_3$$

$A_1$, $A_2$, and $A_3$ represent the "A" values for $R_1$, $R_2$, and $R_3$, respectively. For example the steric bulk of ligand "C":

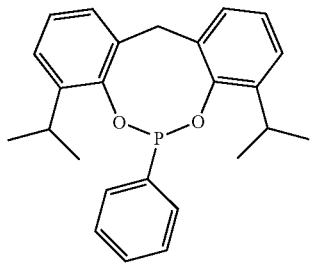

C is characterized by an $A_{TOT}$=7.0 kcal/mol. In this example, $R_1$ is a phenyl radical with $A_1$=2.7 kcal/mol. $R_2$ and $R_3$ are each isopropyl radicals with $A_2$=$A_3$=2.15 kcal/mol. Therefore, $A_{TOT}$=2.7+2.15+2.15=7.0 kcal/mol. Similarly, the steric bulk of ligand "D":

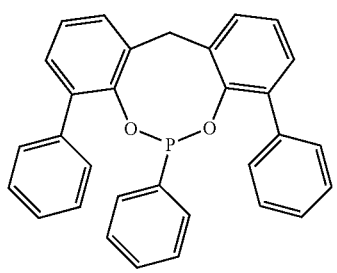

D is characterized by an $A_{TOT}$=8.1 kcal/mol. In this example, $R_1$, $R_2$, and $R_3$ are each a phenyl radical with $A_1$=$A_2$=$A_3$=2.7 kcal/mol. Therefore, $A_{TOT}$=2.7+2.7+2.7=8.1 kcal/mol.

The X group of structure (I) represents an optional bridging group. If the X group is not present, two additional ortho positions relative to the oxygen atoms are available for substituents, one on each of the aromatic rings. In this case, the "A" value of the larger of the two groups in the ortho positions on each of the aromatic rings is used for the determination of $A_{TOT}$.

The phosphonite ligands of our catalyst solution typically have an $A_{TOT}$ of about 6.2 to about 11.5 kcal/mol. Additional examples of $A_{TOT}$ ranges for the phosphonite ligands of our catalyst solutions are $A_{TOT}$ of the structure (I) between about 6.2 to about 11.0 kcal/mol, about 6.2, to about 10.5 kcal/mol, about 6.2 to about 10.0 kcal/mol, about 6.2 to about 9.5 kcal/mol, about 6.2 to about 9.0 kcal/mol, about 6.2 to about 8.5 kcal/mol, about 6.2 to about 8.1 kcal/mol, about 7.0 to about 11.5 kcal/mol, about 7.0 to about 11.0 kcal/mol, about 7.0 to about 10.5 kcal/mol, about 7.0 to about 10.0 kcal/mol, about 7.0 to about 9.5 kcal/mol, about 7.0 to about 9.0 kcal/mol, about 7.0 to about 8.5 kcal/mol, or about 7.0 to about 8.1 kcal/mol.

Examples of phosphonite ligands having an $A_{TOT}$ of about 6.2 to about 11.5 kcal/mol include those where $R_1$ is a phenyl group, $R_2$ and $R_3$ each individually is an ethyl, isopropyl, or phenyl group, and X is optionally present as a methylene group. Additional examples are given by formulas (B), (C), (D), and (E):

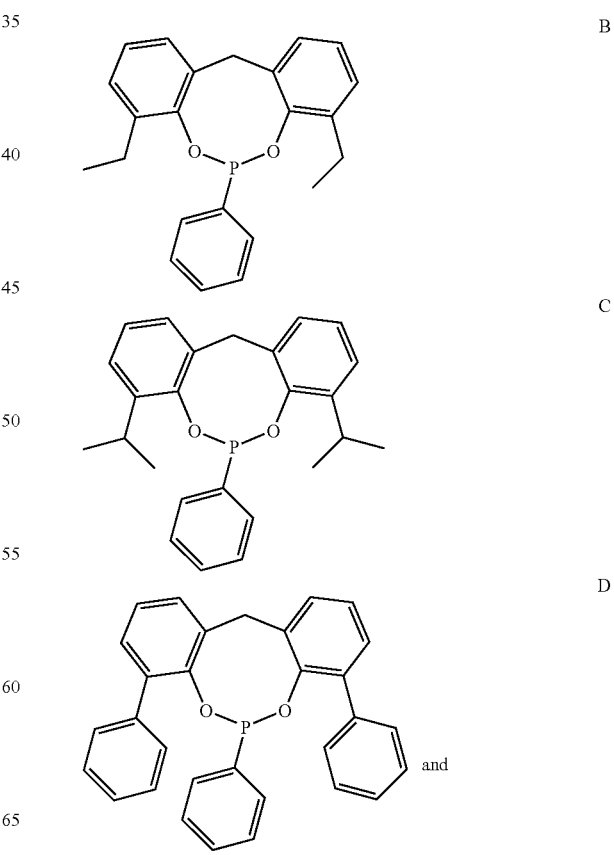

and

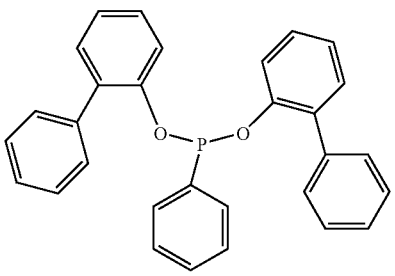

E

The A values for B, C, D, and E are 6.2, 7.0, 8.1, and 8.1 kcal/mol, respectively.

X represents an optional bridging group. The phosphonite ligands of the present invention can be cyclical compounds with X representing a bond or a bridging group between the aromatic carbon atoms in the ortho position relative to the bond between each oxygen atom and each aromatic ring. For example, X may be a chemical bond directly between the ring carbon atoms of each aromatic group. Alternatively, X may comprise a single atom between the ring carbon atoms of each aromatic groups, such as, for example sulfur, oxygen, nitrogen, or silicon. X may also be a group having formula (II):

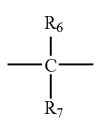

(II)

$R_6$ and $R_7$ are independently selected from hydrogen and alkyl radicals with up to 4 carbon atoms or up to 8 carbon atoms. If X is a non-carbon atom such as nitrogen, silicon or sulfur, the bonding sites not connected to the aromatic rings may be substituted with hydrogen, alkyl, aryl, aroyl, or alkanoyl groups where the alkyl, aryl, aroyl, and alkanoyl groups may contain from 1 to 10 carbon atoms.

The substituents $R_1$, $R_2$, $R_3$, $R_4$, and $R_5$ also individually may represent aryl groups such as, for example, phenyl, naphthyl, anthracenyl, and substituted derivatives thereof. For example, $R_1$, $R_2$, $R_3$, $R_4$, and $R_5$ individually may represent radicals having formulas (III-V).

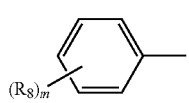

(III)

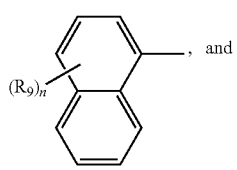

(IV), and

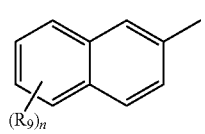

(V)

wherein $R_8$ and $R_9$ are independently selected from alkyl, alkoxy, halogen, cycloalkoxy, formyl, alkanoyl, cycloalkyl, aryl, aryloxy, aroyl, carboxyl, carboxylate salts, alkoxy-carbonyl, alkanoyloxy, cyano, sulfonic acid, and sulfonate salts in which the alkyl moiety of the alkyl, alkoxy, alkanoyl, alkoxycarbonyl and alkanoyloxy groups contains up to 8 carbon atoms. Although it is possible for m to represent 0 to 5 and for n to represent 0 to 7, the value of each of m and n usually will not exceed 2. $R_8$ and $R_9$ may also represent lower alkyl groups, i.e., straight-chain and branched-chain alkyl radicals of up to 4 carbon atoms, and m and n may each represent 0, 1, or 2.

The phosphonite ligands of formula (I) can be prepared by published procedures or by techniques analogous thereto. Typical examples can be found in the procedures described by Louis D. Quin, *A Guide to Organophosphorus Chemistry*, Wiley-Interscience; 2000; New York; p. 62. In general, phosphonites can be prepared similarly by those methods for preparing phosphites. For example, the synthetic routes reported by P. G. Pringle, et al., *Chem. Comm*, 2000, 961-62 are effective.

Rhodium compounds that may be used as a source of rhodium for the active catalyst include rhodium(II) or rhodium(III) salts of carboxylic acids, examples of which include di-rhodium tetraacetate dihydrate, rhodium(II) acetate, rhodium(II) isobutyrate, rhodium(II)2-ethylhexanoate, rhodium (II) benzoate and rhodium(II) octanoate. Also, rhodium carbonyl species such as $Rh_4 (CO)_{12}$, $Rh_6 (CO)_{16}$, and rhodium (1) acetylacetonate dicarbonyl may be suitable rhodium feeds. Additionally, rhodium organophosphine complexes such as tris(triphenylphosphine) rhodium carbonyl hydride may be used when the phosphine moieties of the complex fed are easily displaced by the phosphonite ligands of the present invention. Less desirable rhodium sources are rhodium salts of strong mineral acids such as chlorides, bromides, nitrates, sulfates, phosphates, and the like.

The concentration of the rhodium and ligand in the hydroformylation solvent or reaction mixture is not critical for the successful operation of the present invention. The absolute concentration of rhodium in the reaction mixture or solution may vary from 1 mg/liter up to 5000 mg/liter or more. Typically, the concentration of rhodium in the reaction solution may vary from about 20 mg/liter to about 300 mg/liter. Concentrations of rhodium lower than this range generally do not yield acceptable reaction rates with most olefin reactants and/or require reactor operating temperatures that are so high as to be detrimental to catalyst stability. Higher rhodium concentrations can be expensive because of the high cost of rhodium.

The ratio of gram moles phosphonite ligand to gram atoms rhodium can vary over a wide range, e.g., gram mole phosphonite:gram atom rhodium ratios of about 1:1 to about 200:1. Other examples of the range of the gram mole phosphonite: gram atom rhodium ratio are about 1:1 to about 100:1, about 1:1 to about 70:1, about 1:1 to about 60:1, and about 30:1 to about 60:1.

The hydroformylation catalyst solution comprises at least one solvent that is liquid at the pressure at which the process is being operated. Non-limiting examples of solvents include various alkanes, cycloalkanes, alkenes, cycloalkenes, carbocyclic aromatic compounds, alcohols, esters, ketones, acetals, ethers, and water. More specific examples of solvents include alkane and cycloalkanes such as dodecane, decalin, octane, iso-octane mixtures, cyclohexane, cyclooctane, cyclododecane, methylcyclohexane; aromatic hydrocarbons such as benzene, toluene, xylene isomers, tetralin, cumene; alkyl-substituted aromatic compounds, such as the isomers of diisopropylbenzene, triisopropylbenzene and tert-butylbenzene; alkenes and cycloalkenes such as 1,7-octadiene, dicyclopentadiene, 1,5-cyclooctadiene, octene-1, octene-2,4-vinylcyclohexene, cyclohexene, 1,5,9-cyclododecatriene, 1-pentene; crude hydrocarbon mixtures such as naphtha, mineral oils, and kerosene; high-boiling esters such as dioctylphthalate, 2,2,4-trimethyl-1,3-pentanediol monoisobutyrate, and 2,2,4-trimethyl-1,3-pentanediol diisobutyrate. The aldehyde-containing product of the hydroformylation process also may be used. The solvent can comprise the higher boiling by-products that are naturally formed during the process of the hydroformylation reaction and the subsequent steps, e.g., distillations, that are required for aldehyde product isolation. Any solvent can be used that at least partially dissolves the catalyst and olefin substrate. Example solvents for the production of volatile aldehydes, e.g., butyraldehydes, are those that are sufficiently high boiling to remain, for the most part, in a gas sparged reactor. Example solvents and solvent combinations that also may be used in the production of less volatile and non-volatile aldehyde products include 1-methyl-2-pyrrolidinone, dimethylformamide, perfluorinated solvents such as perfluorokerosene, sulfolane, water, and high boiling hydrocarbon liquids as well as combinations of these solvents. We have found that non-hydroxylic compounds, in general, and hydrocarbons, in particular, may be used as the hydroformylation solvent and that their use can reduce decomposition of the phosphonite ligands.

No special or unusual techniques are required for preparing the catalyst solutions of the present invention, although to obtain a catalyst of high activity, it may be desirable to carry out all manipulations of the rhodium and phosphonite ligand components under an inert atmosphere, e.g., nitrogen, argon, and the like. The desired quantities of a suitable rhodium compound and ligand are charged to the reactor in a suitable solvent. The sequence in which the various catalyst components or reactants are charged to the reactor is not critical.

Another aspect of the invention is a catalyst solution comprising:

i. one or more phosphonite ligands having the general formula (I):

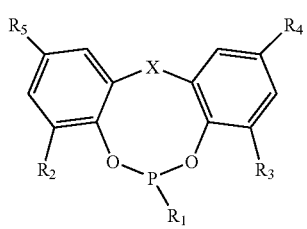

(I)

wherein:
$R_1$, $R_2$, and $R_3$ are independently selected from alkyl radicals with 2 to 8 carbon atoms, benzyl, and aryl groups having formula (III):

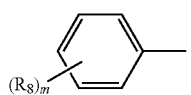

(III)

wherein
$R_8$ is independently selected from alkyl radicals with up to 4 carbon atoms; and
m is 0, 1, or 2;
$R_4$ and $R_5$ are independently selected from hydrogen, alkyl radicals with up to 8 carbon atoms, benzyl, and aryl groups having formula (III);
$R_1$, $R_2$, and $R_3$ together have a steric bulk, $A_{TOT}$, of about 6.2 to about 11.5 kcal/mol as calculated by the following formula: $A_{TOT}=A_1+A_2+A_3$ wherein $A_1$, $A_2$, and $A_3$ are the A values for $R_1$, $R_2$, and $R_3$, respectively; and
X is optionally present as a connecting group having formula (II):

(II)

wherein $R_6$ and $R_7$ are independently selected from hydrogen and alkyl radicals with up to 4 carbon atoms;

ii. rhodium; and
iii. a hydroformylation solvent.

Another aspect of the invention is the catalyst solution described above where $R_1$ is a phenyl group; $R_2$ and $R_3$ are independently selected from ethyl, isopropyl, and phenyl groups; $R_4$ and $R_5$ are independently selected from hydrogen and methyl group; and X is optionally present as a methylene group.

It is understood that these embodiments include the various aspects of substituents, "A" values, rhodium, ratio of gram moles phosphonite ligand to gram atoms rhodium, and hydroformylation solvents, as well as methods for making the phosphonite ligands and catalyst solutions, disclosed above in any combination.

Another aspect of the invention is a catalyst solution consisting essentially of i. one or more phosphonite ligands selected from formulas (B), (C), (D), and (E):

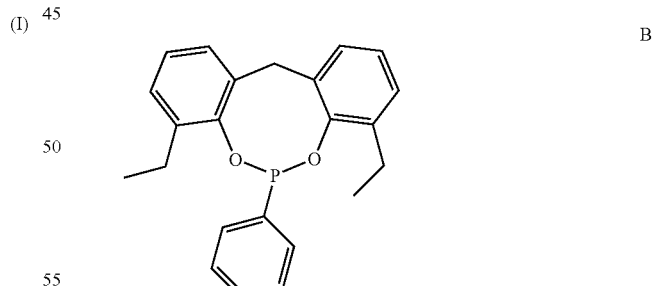

B

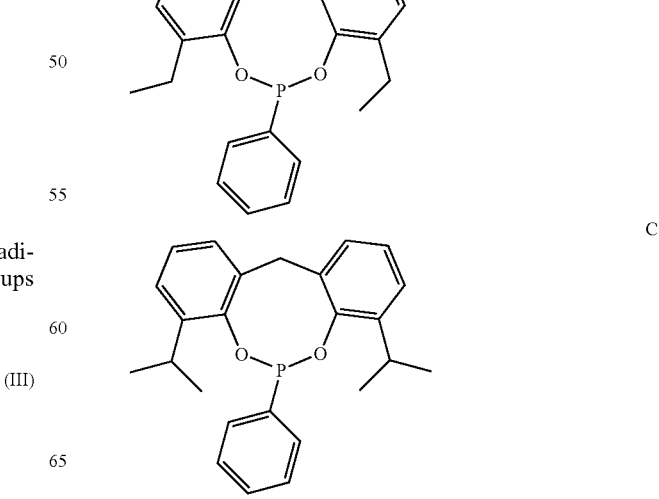

C

-continued

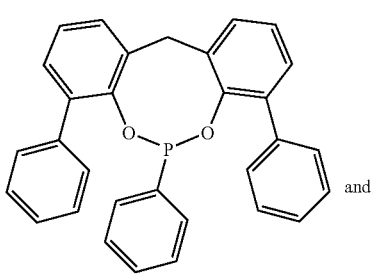

and

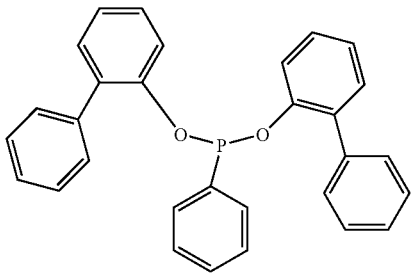

ii. rhodium; and iii. a hydroformylation solvent.

The phrase "consisting essentially of", as used herein, is intended to encompass catalyst solutions having at least one phosphonite ligand of structure (B), (C), (D), or (E), rhodium, and a hydroformylation solvent. In this embodiment, the catalyst solution is understood to exclude any elements that would substantially alter the essential properties of the catalyst solution to which the phrase refers. The catalyst solutions may include other components that do not alter the catalytic properties of the solution. For example, chemicals dissolved into the liquid such as hydrogen and carbon monoxide would not substantially alter the essential properties of the catalyst solution. Also, the catalyst solution may be a multiphase liquid. For example, the addition of palladium, which may alter the catalytic properties of the solution, would be excluded from this embodiment.

Another aspect of the invention is a process for preparing aldehydes comprising contacting an olefin, hydrogen, and carbon monoxide with a catalyst solution comprising:

i. one or more phosphonite ligands having the general formula (I):

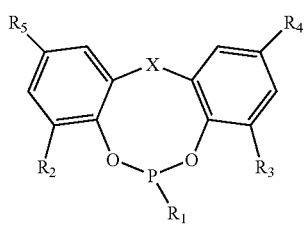

wherein:

$R_1$, $R_2$, and $R_3$ are independently selected from hydrocarbyl radicals with 2 to 20 carbon atoms;

$R_4$ and $R_5$ are independently selected from hydrogen and hydrocarbyl radicals;

$R_2$, $R_3$, $R_4$, and $R_5$ in total contain 4 to 40 carbon atoms;

$R_1$, $R_2$, and $R_3$ together have a steric bulk, $A_{TOT}$, of about 6.2 to about 11.5 kcal/mol as calculated by the following formula: $A_{TOT}=A_1+A_2+A_3$ wherein $A_1$, $A_2$, and $A_3$ are the A values for $R_1$, $R_2$, and $R_3$, respectively; and X is optionally present as a connecting group comprising (a) a chemical bond directly between the ring carbon atoms of each aromatic group, (b) sulfur, oxygen, nitrogen, or silicon, or (c) a group having formula (II):

(II)

wherein $R_6$ and $R_7$ are independently selected from hydrogen and alkyl radicals with up to 8 carbon atoms;

ii. rhodium; and iii. a hydroformylation solvent.

It is understood that this embodiment includes the various aspects of substituents, "A" values, rhodium, ratio of gram moles phosphonite ligand to gram atoms rhodium, and hydroformylation solvents, as well as methods for making the phosphonite ligands and catalyst solutions, disclosed above in any combination.

The olefin feed can be ethylene, but typically comprises olefins capable of forming both linear and branched isomer products. Examples of olefins include, but are not limited to, propylene, butene, pentene, hexene, octene, styrene, non-conjugated dienes such as 1,5-hexadiene, and blends of these olefins. Also the olefin may be substituted with functional groups if these groups do not interfere with the hydroformylation reaction. Representative examples of substituted olefins include unsaturated carboxylic acid esters such as methyl acrylate or methyl oleate, alcohols such as allyl alcohol and 1-hydroxy-2,7-octadiene, ethers such as ethyl vinyl ether, and nitriles such as acrylonitrile.

Mixtures of olefins also can be used in the practice of the present invention. For example, the mixture may be of the same carbon number such as mixtures of n-octenes or it may contain olefins over a range of several carbon numbers.

In yet another example, the olefin reactants comprise mono-α-olefins containing 3 to 10 carbon atoms. The term mono-α-olefin, as used herein, is understood to mean a linear alkene with a chemical formula $C_xH_{2x}$ distinguished by having one double bond located at the primary, or alpha, position. Mono-1-olefins may also be referred to as linear alpha olefins (LAO) or normal alpha olefins (NAO). Non-limiting examples of mono-α-olefins are propylene, butylene, hexene, and the like.

The amount of olefin present in the reaction mixture also is not critical. For example, relatively high-boiling olefins such as 1-octene can function both as the olefin reactant and the process solvent. In another example of the hydroformylation of a gaseous olefin feedstock such as propylene, the partial pressures of the olefin in the vapor space of the reactor typically are in the range of about 0.07 to 35 bars absolute. In practice, the rate of reaction is favored by high concentrations of olefin in the reactor. In the hydroformylation of propylene, the partial pressure of propylene may be greater than 1.4 bars, e.g., from about 1.4 to 10 bars absolute.

According to the invention, the process may be carried out at reaction temperatures in the range of about 20° C. to about 200° C., about 50° C. to about 135° C., or about 75° C. to about 125° C., or about 80° C. to about 120° C. Higher reactor temperatures are not favored because of increased rates of catalyst decomposition while lower reactor temperatures result in relatively slow reaction rates. The total reaction pressure may range from about 0.3 bars absolute up to about 70 bars absolute (about 4 to about 1000 psia), from about 4 bars absolute to about 36 bars absolute (about 58 to about 522 psia), or from about 13.8 bars absolute to about 27.5 bars absolute (about 200 to about 400 psia).

The hydrogen:carbon monoxide molar ratio in the reactor likewise may vary considerably ranging from 10:1 to 1:10 and the sum of the absolute partial pressures of hydrogen and carbon monoxide may range from 0.3 to 36 bars absolute. The partial pressures of the hydrogen and carbon monoxide in the feed is selected according to the linear:branched isomer ratio desired. Generally, the partial pressure of hydrogen in the reactor can be maintained within the range of about 1.4 to about 13.8 bars absolute (about 20 to about 200 psia). The partial pressure of carbon monoxide in the reactor can be maintained within the range of about 1.4 to about 13.8 bars absolute (about 20 to about 200 psia) or from about 4 to about 9 bars absolute and may be varied independently of the hydrogen partial pressure. The molar ratio of hydrogen to carbon monoxide can be varied widely within these partial pressure ranges for the hydrogen and carbon monoxide. The ratios of the hydrogen to carbon monoxide and the partial pressure of each in the feed gas stream (often referred to as synthesis gas or syn gas) can be readily changed by the addition of either hydrogen or carbon monoxide to the synthesis gas stream. We have found that with the phosphonite ligands described herein, the ratio of linear to branched products can be varied widely by changing the partial pressures of the hydrogen and carbon monoxide in the reactor.

Another aspect of the present invention is a process for preparing aldehydes comprising contacting an olefin, hydrogen, and carbon monoxide with a catalyst solution comprising:

i. one or more phosphonite ligands having the general formula (I):

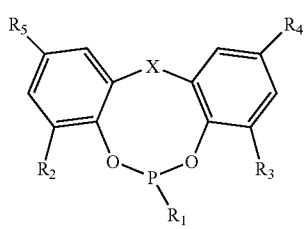

(I)

wherein:

$R_1$, $R_2$, and $R_3$ are independently selected from alkyl radicals with 2 to 8 carbon atoms, benzyl, and aryl groups having formula (III):

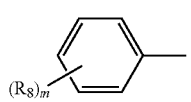

(III)

wherein
$R_8$ is independently selected from alkyl radicals with up to 4 carbon atoms; and
m is 0, 1, or 2;

$R_4$ and $R_5$ are independently selected from hydrogen, alkyl radicals with up to 8 carbon atoms, benzyl, and aryl groups having formula (III);

$R_1$, $R_2$, and $R_3$ together have a steric bulk, $A_{TOT}$, of about 6.2 to about 11.5 kcal/mol as calculated by the following formula: $A_{TOT}=A_1+A_2+A_3$ wherein $A_1$, $A_2$, and $A_3$ are the A values for $R_1$, $R_2$, and $R_3$, respectively;

X is optionally present as a connecting group having formula (II):

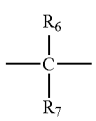

(II)

wherein $R_6$ and $R_7$ are individually hydrogen or alkyl radicals with up to 4 carbon atoms;

ii. rhodium; and iii. a hydroformylation solvent.

It is understood that this embodiment includes the various aspects of substituents, "A" values, rhodium, ratio of gram moles phosphonite ligand to gram atoms rhodium, hydroformylation solvents, methods for making the phosphonite ligands and catalyst solutions, olefins, temperature, pressure, hydrogen, and carbon monoxide, disclosed above in any combination.

The present invention also encompasses the above process where the product comprises normal- and iso-butyraldehyde from a propylene feed and wherein the percent normal-butyraldehyde produced varies in response to a change in one or more process parameters selected from temperature, carbon monoxide partial pressure, and ratio of gram moles phosphonite ligand to gram atoms rhodium. More specifically, the percent normal-butyraldehyde may vary from about 1 to about 20 percent absolute in response to change in one or more process paramaters selected from: temperature that varies within the range of about 80° C. to 120° C.; carbon monoxide partial pressure that varies within the range of about 4 bars absolute to about 9 bars absolute; and ratio of gram moles phosphonite ligand to gram atoms rhodium that varies within the range of about 30:1 to about 60:1.

The term "that varies within the range of", as used herein, is understood to mean that both the value of the process parameter before the change and the value of the process parameter after the change are within the specified range. For example, the percent normal-butyraldehyde may vary in response to a change in the temperature from 90° C. to 102° C.

What is meant by the variation of the absolute percent normal-butyraldehyde is as follows. If at a process condition with temperature 1, carbon monoxide partial pressure 1, and ratio of gram moles phosphonite ligand to gram atoms rhodium 1, the percent normal-butyraldehyde is $N_1$, and at a process condition with temperature 2, carbon monoxide partial pressure 2, and ratio of gram moles phosphonite ligand to gram atoms rhodium 2, the percent normal-butyraldehyde is $N_2$, then the variation of the absolute percent normal-butyraldehyde is the absolute value of $N_1-N_2$. For example, if at the first set of process conditions, the percent normal-butyraldehyde is 60% ($N_1=60$) and at the second set of process conditions, the percent normal-butyraldehyde is 70% ($N_2=70$), then the variation of the absolute percent normal-butyraldehyde is the absolute value of $N_1-N_2$ which is 10%.

It is understood that this embodiment includes the various aspects of substituents, "A" values, rhodium, ratio of gram moles phosphonite ligand to gram atoms rhodium, hydroformylation solvents, methods for making the phosphonite ligands and catalyst solutions, olefins, temperature, pressure, hydrogen, and carbon monoxide, disclosed above in any combination.

Another aspect of the present invention is a process for preparing butyraldehyde comprising: contacting propylene, hydrogen, and carbon monoxide with a catalyst solution comprising:

i. one or more phosphonite ligands selected from formulas (B), (C), (D), and (E):

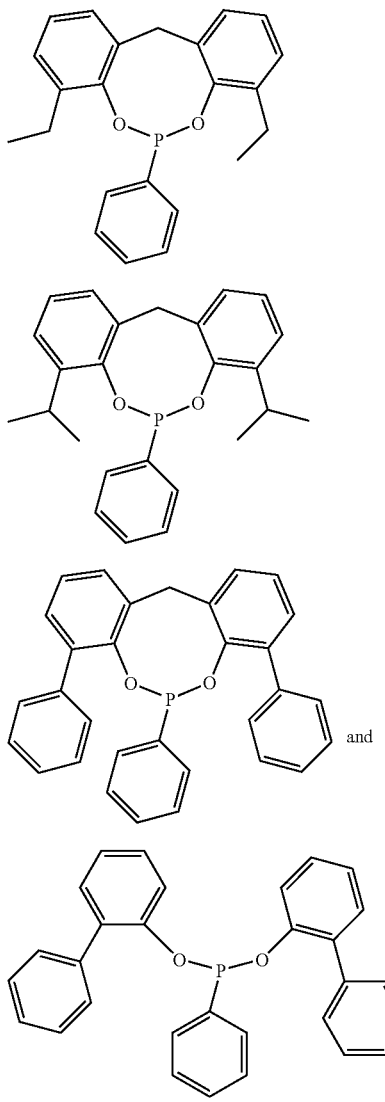

ii. rhodium; and
iii. a hydroformylation solvent wherein the concentration of rhodium in the solution is about 20 mg/liter to about 300 mg/liter; total pressure is about 4 bars absolute to about 36 bars absolute; and wherein the percent normal-butyraldehyde varies from about 1 to about 20 percent absolute in response to a change in one or more process parameters selected from: temperature that varies within the range of about 80° C. to 120° C.; carbon monoxide partial pressure that varies within the range of 4 bars absolute to about 9 bars absolute; and ratio of gram moles phosphonite ligand to gram atoms rhodium that varies within the range of about 30:1 to about 60:1.

It is understood that this embodiment includes the various aspects of rhodium, ratio of gram moles phosphonite ligand to gram atoms rhodium, hydroformylation solvents, methods making the phosphonite ligands and catalyst solutions, olefins, temperature, pressure, hydrogen, and carbon monoxide, disclosed above in any combination.

Any of the known hydroformylation reactor designs or configurations may be used in carrying out the process provided by the present invention. Thus, a gas-sparged, vapor take-off reactor design as disclosed in the examples set forth herein may be used. In this mode of operation, the catalyst which is dissolved in a high boiling organic solvent under pressure does not leave the reaction zone with the aldehyde product taken overhead by the unreacted gases. The overhead gases then are chilled in a vapor/liquid separator to liquefy the aldehyde product and the gases can be recycled to the reactor. The liquid product is let down to atmospheric pressure for separation and purification by conventional techniques. The process also may be practiced in a batchwise manner by contacting the olefin, hydrogen, and carbon monoxide with the present catalyst in an autoclave.

A reactor design where catalyst and feedstock are pumped into a reactor and allowed to overflow with product aldehyde, i.e. liquid overflow reactor design, is also suitable. For example, high boiling aldehyde products such as nonyl aldehydes may be prepared in a continuous manner with the aldehyde product being removed from the reactor zone as a liquid in combination with the catalyst. The aldehyde product may be separated from the catalyst by conventional means such as by distillation or extraction and the catalyst then recycled back to the reactor. Water soluble aldehyde products, such as hydroxy butyraldehyde products obtained by the hydroformylation of allyl alcohol, can be separated from the catalyst by extraction techniques. A trickle-bed reactor design also is suitable for this process. It will be apparent to those skilled in the art that other reactor schemes may be used with this invention.

The phosphonite ligands of the present invention can be substituted for, or used in combination with, known phosphite and phosphine ligands in a wide range of catalyst solutions using rhodium as the primary catalyst component. The novel catalyst solutions may be used in a wide variety of transition metal-catalyzed processes such as, for example, hydroformylation, hydrogenation, isomerization, hydrocyanation, hydrosilation, carbonylations, oxidations, acetoxylations, epoxidations, hydroamination, dihydroxylation, cyclopropanation, telomerizatons, carbon hydrogen bond activation, olefin metathesis, olefin dimerizations, oligomerizations, olefin polymerizations, olefin-carbon monoxide copolymerizations, butadiene dimerization and oligomerization, butadiene polymerization, and other carbon-carbon bond forming reactions such as the Heck reaction and arene coupling reactions. The catalyst solutions provided by the present invention are especially useful for the hydroformylation of olefins to produce aldehydes.

The various embodiments of the present invention are further illustrated by the following examples. It should be understood, however, that the present invention is by no means restricted to such specific examples.

EXAMPLES

Phosphonite Ligand Synthesis

A series of phosphonites were synthesized by reaction of phenyldicholorophosphine or alkyldicholorophosphine with corresponding substituted methylene bisphenols or other ortho-substituted phenols in the presence of triethylamine. All of the syntheses were carried out under nitrogen.

A typical procedure follows: a methylene bisphenol (20 mmol) was mixed with triethylamine (44 mmol) in a mixed solvent (toluene:cyclohexane 2:1) and stirred. An ice-bath was applied to maintain the reaction temperature below 5° C. Then a solution of phenyldicholorophosphine or alkyldicholorophosphine (20 mmol) in toluene (20 to 40 ml) was added slowly into the reaction mixture. After addition, the reaction was continued at 5° C. or lower for 30 min. The temperature was then raised to ambient temperature for 1 hour. The reaction was heated to 50° C. for 6 to 10 hours after which complete disappearance of the starting bisphenol was shown by GC analysis. The by-product formed as a precipitate and was removed by filtration. The reaction mixture containing the phosphonite ligand was washed with water (2×20 ml), 0.5% KOH aqueous solution (in some cases), and then washed with brine (2×20 ml). After the final aqueous wash, the aqueous phase was separated from the organic phase reaction mixture which was dried with anhydrous sodium sulfate. The solvents were removed under vacuum by distillation or simple evaporation to afford the phosphonite compounds. In all cases, these compounds were either white solids or clear liquids. All of these compounds were very soluble in common organic solvents such as diethyl ether, THF, toluene, ethyl acetate, chloroform, and others. Reaction yields were normally greater than 85%. Each ligand was purified either by recrystallization (for example, in toluene:heptane mixture), distillation, or column chromatography. Spectroscopic data and chemical structures of these compounds are listed below:

Ligand "A":

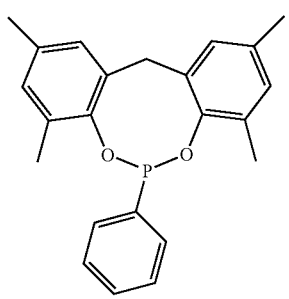

Methylene bis(4,6-dimethylphenyl)phenylphosphonite, white solid. $^{31}$P NMR (CDCl$_3$): 162.14 ppm (s). $^1$H NMR (CDCl$_3$): 2.2274 (s, 6H), 2.2640 (s, 6H), 3.3630(d, 1H), 4.4629(dd, 1H), 6.8496(s, 2H), 7.0310(s, 2H), 7.5814-7.5521 (m, 3H), 8.0411-8.0018(m, 2H) ppm.

Ligand "B":

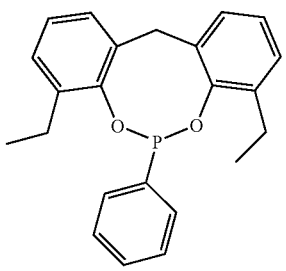

methylene bis(6-ethylphenyl)phenylphosphonite, clear liquid. $^{31}$P NMR (CDCl$_3$): 163.2891 ppm (s). $^1$H NMR (CDCl$_3$): 1.2148(m, 6H), 2.6610(m, 4H), 3.4866(d, 1H), 4.5448(dd, 1H), 6.9865-7.0662(m, 4H), 7.1266-7.1669(m, 1H), 7.2273-7.2612(m, 2H), 7.5287-7.6005(m, 3H), 8.0021-8.0424(m, 2H) ppm.

Ligand "C":

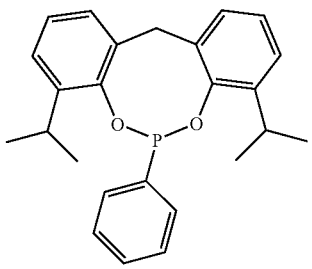

methylene bis(6-iso-propylphenyl)phenylphosphonite, viscous liquid, slowly crystallized. $^{31}$P NMR (CDCl$_3$): 163.8125 ppm (s). $^1$H NMR (CDCl$_3$): 1.2057(t, 12H), 3.2705(h, 4H), 3.5105(d, 1H), 4.5325-4.5738(dd, 1H), 7.0337-7.0694(m, 2H), 7.1189-7.1775(m, 3H), 7.2242-7.2746(m, 2H), 7.5750-7.6089(m, 3H), 7.9871-8.0430(m, 2H) ppm.

Ligand "D":

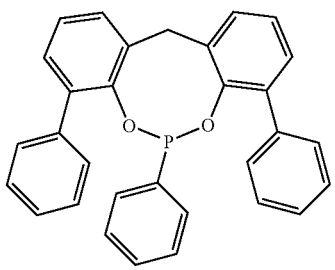

methylene bis(6-phenylphenyl)phenylphosphonite, white crystals. $^{31}$P NMR (CDCl$_3$): 168.7176 ppm (s). $^1$H NMR (CDCl$_3$): 3.6500(d, 1H), 4.6176-4.6588(dd, 1H), 6.9164-6.9594(m, 2H), 7.1389-7.4970(m, 19H) ppm.

Ligand "E":

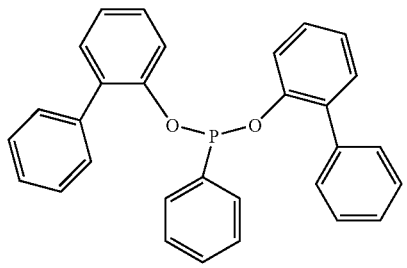

O,O-Di(2-phenylphenyl)Phenylphosphonite, white crystals. $^{31}$P NMR (CDCl$_3$): 159.6737 ppm (s). $^1$H NMR (CDCl$_3$): 7.2567-7.3546 (m, br.).

Ligand "F":

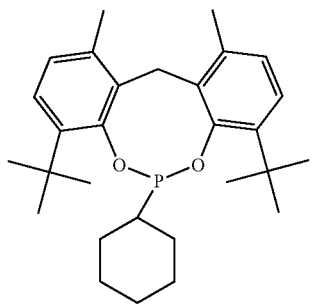

methylene bis(4-methyl-6-tert-butylphenyl)cyclohexylphosphonite, white crystals. $^{31}$P NMR (CDCl$_3$): 188.7388 ppm (s). $^1$H NMR (CDCl$_3$): 1.3684(m, 22H), 1.7082-1.8016 (m, 3H), 1.9298-1.9655(m, 3H), 2.2733-2.3529(m, 7H), 3.2587(d, 1H), 4.2936(dd, 1H), 6.9697(s, 2H), 7.1108(s, 2H) ppm.

Ligand "G":

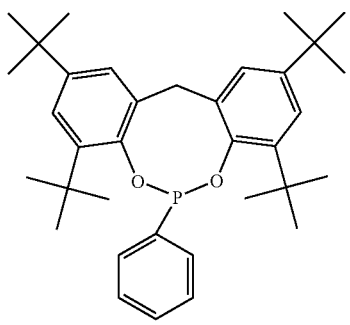

methylene bis(4,6-di-tert-butylphenyl)phenyl phosphonite, white crystals. $^{31}$P NMR (CDCl$_3$): 163.22 ppm (s). $^1$H NMR (CDCl$_3$): 1.2561(s, 18H), 1.3147(s, 18H), 3.4921(d, 1H), 4.5696(dd, 1H), 7.2265(d, 2H), 7.3653(d, 2H), 7.5562(m, 3H), 8.0517(m, 2H) ppm.

Ligand "H":

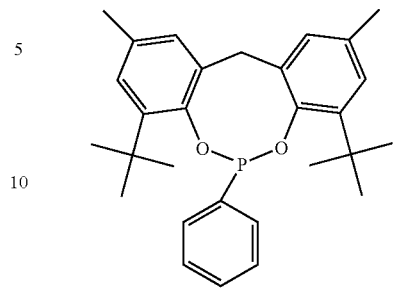

methylene bis(4-methyl-6-tert-butylphenyl)phenylphosphonite, white crystals. $^{31}$P NMR (CDCl$_3$): 163.8728 ppm (s). $^1$H NMR (CDCl$_3$): 1.2330(s, 18H), 2.2972(s, 6H), 3.4141(d, 1H), 4.5007-4.5401(dd, 1H), 6.9951(d, 2H), 7.1631(d, 2H), 7.5385-7.5500(m, 3H), 8.0294-8.0688(m, 2H) ppm.

Ligand "J":

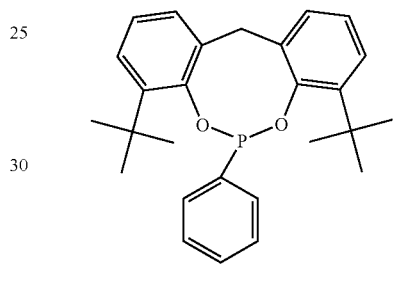

methylene bis(6-tert-butylphenyl)phenylphosphonite, white crystals. $^{31}$P NMR (CDCl$_3$): 163.9346 ppm (s). $^1$H NMR (CDCl$_3$): 1.2475(s, 18H), 3.5302(d, 1H), 4.5720-4.6046(dd, 1H), 7.0374(m, 2H), 7.2032-7.3543(m, 4H), 7.5549(m, 3H), 8.0678(m, 2H) ppm.

Hydroformylation of Propylene

The hydroformylation of propylene to produce butyraldehydes was carried out in a vapor take-off reactor consisting of a vertically arranged stainless steel pipe having a 2.5 cm inside diameter and a length of 1.2 meters. The reactor was encased in an external jacket that was connected to a hot oil machine. The reactor had a filter element welded into the side down near the bottom of the reactor for the inlet of gaseous reactants. The reactor contained a thermowell arranged axially with the reactor in its center for accurate measurement of the temperature of the hydroformylation reaction mixture. The bottom of the reactor had a high pressure tubing connection that was connected to a cross. One of the connections to the cross permitted the addition of non-gaseous reactants such as octene-1 or make-up solvent, another led to the high-pressure connection of a differential pressure (D/P) cell that was used to measure catalyst level in the reactor and the bottom connection was used for draining the catalyst solution at the end of the run.

In the hydroformylation of propylene in a vapor take-off mode of operation, the hydroformylation reaction mixture or solution containing the catalyst was sparged under pressure with the incoming reactants of propylene, hydrogen, and carbon monoxide as well as any inert feed such as nitrogen. As butyraldehyde was formed in the catalyst solution, it and unreacted reactant gases were removed as a vapor from the top of the reactor by a side-port. The vapor removed was chilled in a high-pressure separator where the butyraldehyde product was condensed along with some of the unreacted propylene. The uncondensed gases were let down to atmospheric pressure via the pressure control valve. These gases passed through a series of dry-ice traps where any other aldehyde product was collected. The product from the high-pressure separator was combined with that of the traps, and was subsequently weighed and analyzed by standard gas/liquid phase chromatography (GLC) techniques for the net weight and normal/iso ratio of the butyraldehyde product.

The gaseous feeds to the reactor were fed to the reactor via twin cylinder manifolds and high-pressure regulators. The hydrogen passed through a mass flow controller and then through a commercially available DEOXO® (available from Engelhard Inc.) catalyst bed to remove any oxygen contamination. The carbon monoxide passed through an iron carbonyl removal bed (as disclosed in U.S. Pat. No. 4,608,239), a similar DEOXO® bed heated to 125° C., and then a mass flow controller. Nitrogen could be added to the feed mixture as an inert gas. Nitrogen, when added, was metered in and then mixed with the hydrogen feed prior to the hydrogen DEOXO® bed. Propylene was fed to the reactor from feed tanks that were pressurized with hydrogen and was controlled using a liquid mass flow meter. All gases and propylene were passed through a preheater to insure complete vaporization of the liquid propylene prior to entering the reactor.

Comparative Example 1

This example illustrates a typical hydroformylation run and the use of Ligand "F" for hydroformylation of propylene. A catalyst solution was prepared under nitrogen using a charge of 7.5 mg of rhodium (0.075 mmol, as rhodium 2-ethylhexanoate); ligand "F" (methylene bis(4-methyl-6-tert-butylphenyl)cyclohexylphosphonite), 1.02 g, (2.25 mmol); 20 ml of normal butyraldehyde and 190 ml of dioctylphthalate. The mixture was stirred under nitrogen until a homogeneous solution was obtained (heated if necessary). The mixture was charged to the reactor in a manner described previously and the reactor sealed. The reactor pressure control was set at 17.9 bars gauge (260 psig) and the external oil jacket on the reactor was heated to 115° C. Hydrogen, carbon monoxide, nitrogen, and propylene vapors were fed through the frit at the base of the reactor and the reactor was allowed to build pressure. The hydrogen and carbon monoxide (H2/CO ratio was set to be 1:1) were fed to the reactor at a rate of 6.8 liters/min and the nitrogen feed was set at 1.0 liter/min. The propylene was metered as a liquid, vaporized, and fed at a vapor rate of 1.89 liters/min (212 grams/hour). The temperature of the external oil was modified to maintain an internal reactor temperature of 115° C. The unit was operated for 5 hours and hourly samples taken. The hourly samples were analyzed as described above using a standard GC method. The last three samples were used to determine the N/I ratio and catalyst activity. The butyraldehyde production rate for the last three hours averaged 45.5 g/hour for a catalyst activity of 6.06 kilograms butyraldehyde/gram of rhodium-hour. The product N/I ratio was 1.56, or 60.9% n-butyraldehyde. Process conditions, N/I ratio of aldehyde product, and catalyst activity are shown in Table 1.

Comparative Examples 2-9

Hydroformylation experiments were carried out in the manner of Comparative Example 1 utilizing a variety of reaction conditions and ligands. The results of these experiments are tabulated in Table 1 which shows the $A_{TOT}$ for each ligand, the amount of ligand in grams, the ratio of gram moles ligand to gram atoms rhodium, the reactor temperature in ° C., the carbon monoxide partial pressure, the ratio of normal- to iso-butyraldehyde, the weight percent of normal-butyraldehyde, and the activity. All runs were made with a total syn gas pressure of 12.5 bars gauge. All of the Comparative Examples used 7.5 mg rhodium except Comparative Example 7 which used 3.75 mg rhodium. All the reactions where carried out using dioctylphthalate as the hydroformylation solvent except Comparative Example 9 which used TEXANOL® ester alcohol (available from Eastman Chemical Company), 2,2,4-Trimethyl-1,3-pentanediol monoisobutyrate. Activity is determined as kilograms of butyraldehydes produced per gram of rhodium per hour.

TABLE 1

COMPARATIVE EXAMPLES 1-9

| Ex. No. | Ligand | $A_{TOT}$ (kcal/mol) | Ligand (gm) | [L]/[Rh] | Temp (° C.) | CO, barg | N/I ratio | % N | Activity |
|---|---|---|---|---|---|---|---|---|---|
| 1 | F | 12.0 | 1.02 | 30 | 115 | 6.3 | 1.56 | 60.9 | 6.06 |
| 2 | F | 12.0 | 2.04 | 60 | 105 | 6.3 | 2.05 | 67.2 | 4.09 |
| 3 | G | 12.5 | 1.19 | 30 | 115 | 6.3 | 1.47 | 59.5 | 14.54 |
| 4 | G | 12.5 | 1.38 | 60 | 105 | 4.2 | 1.60 | 61.5 | 19.62 |
| 5 | H | 12.5 | 1.00 | 30 | 115 | 6.3 | 1.40 | 58.3 | 16.18 |
| 6 | H | 12.5 | 2.00 | 60 | 105 | 4.2 | 1.53 | 60.5 | 20.85 |
| 7 | H | 12.5 | 2.00 | 120 | 85 | 4.2 | 2.03 | 67.0 | 25.93 |
| 8 | J | 12.5 | 0.94 | 30 | 115 | 6.3 | 1.33 | 57.1 | 16.34 |
| 9 | J | 12.5 | 0.94 | 30 | 85 | 6.3 | 1.86 | 65.0 | 8.75 |

Examples 1-23

Hydroformylation experiments were carried out in the manner of Comparative Example 1 utilizing a variety of reaction conditions and ligands. The results of these experiments are tabulated in Table 2 which shows the $A_{TOT}$ for each ligand, the amount of ligand in grams, the ratio of gram moles ligand to gram atoms rhodium, the reactor temperature in ° C., the carbon monoxide partial pressure, the ratio of normal- to iso-butyraldehyde, the percent of normal-butyraldehyde, and the activity. All runs were made with a total syn gas pressure of 12.5 bars gauge. All the reactions where carried out using dioctylphthalate as the hydroformylation solvent except Examples 14-21 which used TEXANOL® ester alcohol (TEXANOL® is a registered trademark of Eastman Chemical Company), 2,2,4-Trimethyl-1,3-pentanediol monoisobutyrate. Activity is determined as kilograms of butyraldehydes produced per gram of rhodium per hour.

TABLE 2

EXAMPLES 1-23

| Ex. No. | Ligand | $A_{TOT}$ (kcal/mol) | Ligand (gm) | [L]/[Rh] | Temp (° C.) | CO barg | N/I ratio | % N | Activity |
|---|---|---|---|---|---|---|---|---|---|
| 1 | A | 6.2 | 0.82 | 30 | 115 | 6.3 | 2.9 | 74.4 | 2.95 |
| 2 | A | 6.2 | 1.64 | 60 | 105 | 4.2 | 4.7 | 82.5 | 0.82 |
| 3 | B | 6.2 | 0.81 | 30 | 115 | 6.3 | 2.10 | 67.7 | 7.95 |
| 4 | B | 6.2 | 1.62 | 60 | 105 | 4.2 | 3.80 | 79.2 | 3.23 |
| 5 | B | 6.2 | 1.62 | 60 | 95 | 4.2 | 3.46 | 77.6 | 1.83 |
| 6 | C | 7.0 | 0.87 | 30 | 115 | 6.3 | 2.15 | 68.3 | 6.68 |
| 7 | C | 7.0 | 0.87 | 30 | 95 | 6.3 | 2.59 | 72.1 | 4.35 |
| 8 | C | 7.0 | 0.87 | 30 | 95 | 4.2 | 3.52 | 77.9 | 15.15 |
| 9 | C | 7.0 | 1.74 | 60 | 105 | 4.2 | 4.04 | 80.2 | 4.72 |
| 10 | C | 7.0 | 1.74 | 60 | 95 | 6.3 | 3.35 | 77.0 | 2.37 |

TABLE 2-continued

EXAMPLES 1-23

| Ex. No. | Li- gand | A$_{TOT}$ (kcal/ mol) | Ligand (gm) | [L]/ [Rh] | Temp (° C.) | CO barg | N/I ratio | % N | Ac- tivity |
|---|---|---|---|---|---|---|---|---|---|
| 11 | D | 8.1 | 1.03 | 30 | 115 | 6.3 | 1.81 | 64.4 | 6.86 |
| 12 | D | 8.1 | 2.06 | 60 | 105 | 4.2 | 3.10 | 75.6 | 3.31 |
| 13 | D | 8.1 | 2.06 | 60 | 95 | 4.2 | 3.37 | 77.1 | 2.42 |
| 14 | D | 8.1 | 0.52 | 15 | 95 | 6.3 | 1.62 | 61.8 | 15.90 |
| 15 | D | 8.1 | 1.03 | 30 | 115 | 6.3 | 1.73 | 63.4 | 12.54 |
| 16 | D | 8.1 | 1.03 | 30 | 95 | 6.3 | 2.25 | 69.2 | 6.60 |
| 17 | D | 8.1 | 1.03 | 30 | 95 | 4.2 | 2.70 | 73.0 | 6.97 |
| 18 | D | 8.1 | 1.03 | 30 | 85 | 6.3 | 2.50 | 71.4 | 3.12 |
| 19 | D | 8.1 | 1.03 | 30 | 95 | 5.3 | 2.48 | 71.3 | 6.29 |
| 20 | D | 8.1 | 2.06 | 60 | 95 | 6.3 | 2.67 | 72.8 | 4.03 |
| 21 | D | 8.1 | 2.06 | 60 | 95 | 4.2 | 3.24 | 76.4 | 4.18 |
| 22 | E | 8.1 | 1.00 | 30 | 115 | 6.3 | 1.95 | 66.1 | 10.26 |
| 23 | E | 8.1 | 2.00 | 60 | 95 | 4.2 | 3.4 | 77.3 | 1.2 |

The Comparative Examples in Table 1 show that the normal- to iso-butyraldehyde ratio (N/I) varied from 1.33 to 2.05 with a corresponding variation in weight percent normal butyraldehyde of 10.1%. The variation was achieved by changing the structure of the ligand, the ratio of gram moles ligand to gram atoms rhodium, temperature, and the hydrogen and carbon monoxide partial pressures in the synthesis gas. The Examples in Table 2 represent the present invention and show that the normal- to iso-butyraldehyde ratio (N/I) varied from 1.62 to 4.7 with a corresponding variation in weight percent normal-butyraldehyde of 61.8% to 82.5% which corresponds to an overall change in the weight percent normal-butyraldehyde of 20.7%. The variation was achieved by changing the structure of the ligand, the ratio of gram moles ligand to gram atoms rhodium, temperature, and the hydrogen and carbon monoxide partial pressures in the synthesis gas. Table 3 presents the changes in weight percent normal-butyraldehyde for various ligands where one experiment was conducted at a gram mole ligand to gram atom rhodium ratio of 30, a temperature of 115° C., and a carbon monoxide partial pressure of 4.2 bars gauge and the other experiment was conducted at a gram mole ligand to gram atom rhodium ratio of 60, a temperature of 105° C., and a carbon monoxide partial pressure of 6.3 bars gauge. Example 23 was conducted at a gram mole ligand to gram atom rhodium ratio of 60, a temperature of 95° C., and a carbon monoxide partial pressure of 4.2 bars gauge.

TABLE 3

VARIATION IN PERCENT NORMAL-BUTYRALDEHYDE

| Ligand | Examples | Δ % N |
|---|---|---|
| G | Comparative Ex. 3, 4 | 2.0 |
| H | Comparative Ex. 5, 6 | 2.2 |
| A | Ex. 1, 2 | 8.1 |
| B | Ex. 3, 4 | 11.5 |
| C | Ex. 6, 9 | 11.9 |
| D | Ex. 11, 12 | 11.2 |
| E | Ex. 22, 23 | 11.2 |

What is claimed is:

1. A catalyst solution comprising:
   i. one or more phosphonite ligands having the general formula (I):

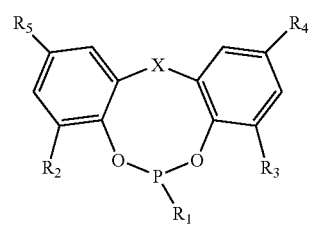

wherein:

$R_1$ is a phenyl group;

$R_2$, and $R_3$ are independently selected from ethyl, iso-propyl, and phenyl group;

$R_4$ and $R_5$ are independently selected from hydrogen and methyl group;

$R_1$, $R_2$, and $R_3$ together have a steric bulk, $A_{TOT}$, of about 6.2 to about 11.5 kcal/mol as calculated by the following formula: $A_{TOT}=A_1+A_2+A_3$ wherein $A_1$, $A_2$, and $A_3$ are the A values for $R_1$, $R_2$, and $R_3$, respectively; and X is optionally present as a methylene group;

ii. rhodium; and
   iii. a hydroformylation solvent.

2. The catalyst solution according to claim 1 wherein the one or more phosphonite ligands comprises a phosphonite ligand selected from formulas (B), (C), (D), and (E):

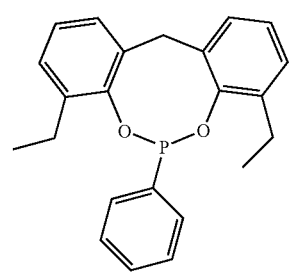

B

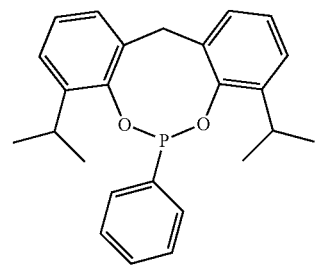

C

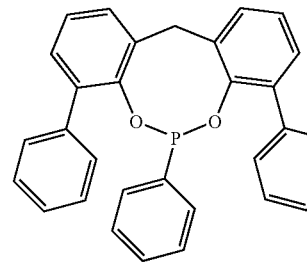

D and

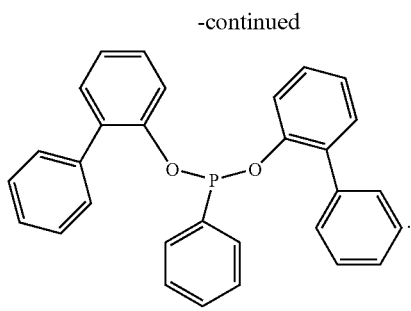

E

3. The catalyst solution according to claim 2 wherein the one or more phosphonite ligands comprises a phosphonite ligand having the formula (D):

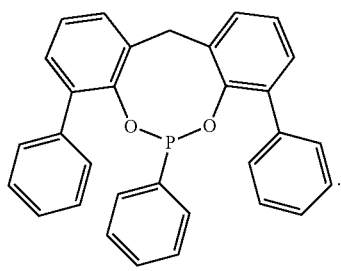

D

4. The catalyst solution according to claim 1 wherein the hydroformylation solvent comprises alkanes, cycloalkanes, alkenes, cycloalkenes, carbocyclic aromatic compounds, esters, ketones, acetals, ethers, or mixtures thereof.

5. The catalyst solution according to claim 1 wherein the rhodium concentration is about 20 mg/liter to about 300 mg/liter; and the ratio of gram moles phosphonite ligand to gram atoms rhodium is about 1:1 to about 100:1.

6. A catalyst solution consisting essentially of:
   i. one or more phosphonite ligands selected from formulas (B), (C), (D), and (E):

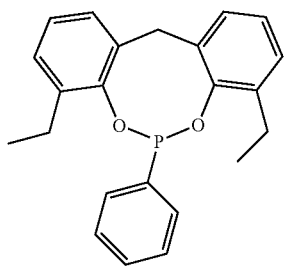

B

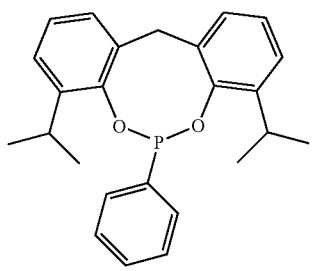

C

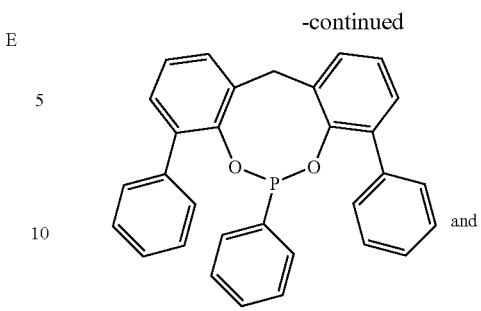

D and

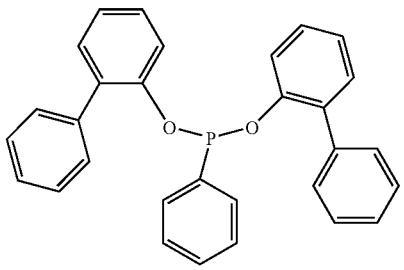

E ii. rhodium; and
   iii. a hydroformylation solvent.

7. A process for preparing butyraldehyde comprising: contacting propylene, hydrogen, and carbon monoxide with a catalyst solution comprising:
   i. one or more phosphonite ligands selected from formulas (B), (C), (D), and (E):

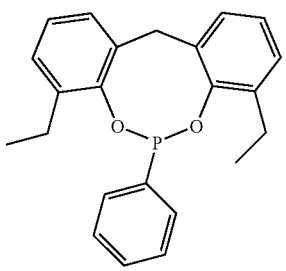

B

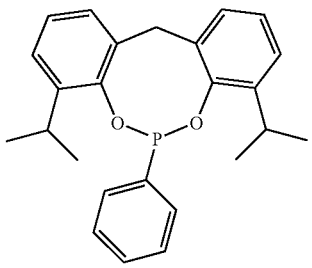

C

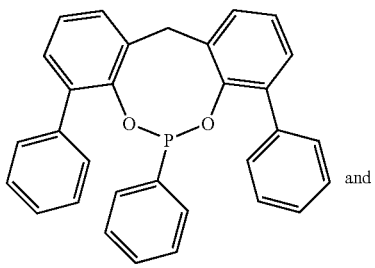

D and

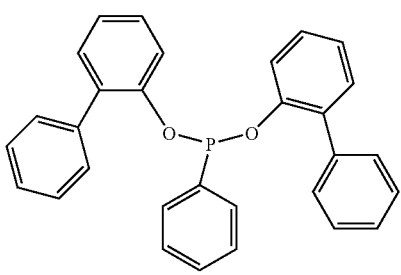

ii. rhodium; and
iii. a hydroformylation solvent wherein the concentration of rhodium in the solution is about 20 mg/liter to about 300 mg/liter; a total pressure is about 4 bars absolute to about 36 bars absolute; and wherein the percent normal-butyraldehyde varies from about 1 to about 20 percent absolute in response to a change in one or more process parameters selected from temperature that varies within the range of about 80° C. to about 120° C.;

carbon monoxide partial pressure that varies within the range of about 4 bars absolute to about 9 bars absolute; and ratio of gram moles phosphonite ligand to gram atoms rhodium that varies within the range of about 30:1 to about 60:1.

* * * * *